US012520091B2

(12) United States Patent
Ungstrup et al.

(10) Patent No.: US 12,520,091 B2
(45) Date of Patent: Jan. 6, 2026

(54) HEARING AID WITH SELF FITTING CAPABILITIES

(71) Applicant: Widex A/S, Lynge (DK)

(72) Inventors: Michael Ungstrup, Allerod (DK); Preben Kidmose, Maarslet (DK); Mike Lind Rank, Farum (DK)

(73) Assignee: T&W Engineering A/S, Lynge (DK)

( * ) Notice: Subject to any disclaimer, the term of this patent is extended or adjusted under 35 U.S.C. 154(b) by 0 days.

(21) Appl. No.: 14/167,256

(22) Filed: Jan. 29, 2014

(65) Prior Publication Data

US 2014/0148724 A1    May 29, 2014

Related U.S. Application Data

(63) Continuation-in-part of application No. PCT/EP2011/063361, filed on Aug. 3, 2011.

(51) Int. Cl.
*A61B 5/38* (2021.01)
*A61B 5/12* (2006.01)
*H04R 25/00* (2006.01)

(52) U.S. Cl.
CPC ............. *H04R 25/70* (2013.01); *A61B 5/121* (2013.01); *A61B 5/38* (2021.01)

(58) Field of Classification Search
None
See application file for complete search history.

(56) References Cited

U.S. PATENT DOCUMENTS

2001/0049480 A1\* 12/2001 John ............... A61B 5/0051
                                                     600/559
2004/0064066 A1\* 4/2004 John ............... A61B 5/04845
                                                     600/559
(Continued)

FOREIGN PATENT DOCUMENTS

EP        1073314 A1    1/2001
WO     01/87147 A2    11/2001
(Continued)

OTHER PUBLICATIONS

Rance et al. Hearing Threshold Estimation in Infants Using Auditory Steady-State Responses. Journal of the American Academy of Audiology, 16:291-300 (2005). (Year: 2005).\*

(Continued)

*Primary Examiner* — Etsub D Berhanu
(74) *Attorney, Agent, or Firm* — Sughrue Mion, PLLC

(57) ABSTRACT

A personal hearing aid (1) is adapted to be carried at the head of a person. The hearing aid comprises an EEG sensor part having electrodes (3) for measuring EEG responses from said person. The hearing aid comprises an EEG signal analyzer (5, 5') adapted for having an EEG signal transferred from the EEG sensor part, and adapted for monitoring the EEG response. The hearing aid (1) further comprises EEG stimuli controlling means adapted for performing at least one of the following: providing a stimulus to the person, requesting the person to perform a stimuli creating act, or identifying a stimuli creating ambient sound. The hearing aid comprises EEG response detection means for identifying an induced response from the EEG response caused by the stimuli, and a classifier for deciding based on said induced response if the electrodes receive EEG responses. The invention further provides a method of adjusting a hearing aid.

15 Claims, 10 Drawing Sheets

(56) References Cited

U.S. PATENT DOCUMENTS

| | | | |
|---|---|---|---|
| 2004/0071295 A1* | 4/2004 | Wasden | A61B 5/12 381/60 |
| 2004/0220494 A1* | 11/2004 | Sturzebecher | A61B 5/38 128/920 |
| 2005/0018858 A1* | 1/2005 | John | A61B 5/121 381/60 |
| 2006/0161075 A1* | 7/2006 | Kurtz | A61B 5/38 600/559 |
| 2006/0210090 A1* | 9/2006 | Shennib | A61B 5/121 381/67 |
| 2007/0191727 A1* | 8/2007 | Fadem | A61B 5/6814 600/544 |
| 2008/0287821 A1* | 11/2008 | Jung | G16H 10/20 600/544 |
| 2009/0137924 A1* | 5/2009 | Kapoor | G06K 9/00463 600/545 |
| 2009/0156956 A1* | 6/2009 | Milgramm | A61B 5/6814 600/544 |
| 2010/0076339 A1* | 3/2010 | Marcoux | H04R 25/70 600/559 |
| 2010/0257128 A1* | 10/2010 | De Vries | H04R 25/70 706/12 |
| 2010/0310101 A1* | 12/2010 | Anderson | A61B 5/11 381/309 |
| 2011/0125046 A1* | 5/2011 | Burton | A61B 5/0476 600/544 |
| 2011/0188664 A1 | 8/2011 | Morikawa et al. | |

FOREIGN PATENT DOCUMENTS

| | | | | |
|---|---|---|---|---|
| WO | 2006/009771 A1 | 1/2006 | | |
| WO | 2008/116462 A1 | 10/2008 | | |
| WO | WO 2010117264 A1 * | 10/2010 | | A61B 5/04845 |
| WO | WO 2010149157 A1 * | 12/2010 | | A61B 5/0476 |
| WO | 2011/000383 A1 | 1/2011 | | |
| WO | 2011/001694 A1 | 1/2011 | | |
| WO | WO-2011006681 A1 * | 1/2011 | | H04R 25/70 |

OTHER PUBLICATIONS

Picton et al. Estimating Audiometric Thresholds Using Auditory Steady-State Responses. Journal of the American Academy of Audiology, 16:140-156 (2005). (Year: 2005).*
A Clinician's Encounter with the Auditory Steady-State Response (ASSR). The Hearing Review. May 2, 2004. (Year: 2004).*
Attias et al. Multiple Auditory Steady-State Responses in Children and Adults with Normal Hearing, Sensorineural Hearing Loss, or Auditory Neuropathy. Annals of Otology, Rhinology & Laryngology, 115(4):268-276. (Year: 2006).*
International Search Report for PCT/EP2011/063361 dated Oct. 21, 2011 with Written Opinion.
Communication dated Oct. 11, 2018, from European Patent Office in counterpart application No. 11743502.4.
Office Action issued Feb. 27, 2020 in European Application No. 11743502.4.

* cited by examiner

HEARING AID WITH SELF FITTING CAPABILITIES

RELATED APPLICATIONS

The present application a continuation-in-part of International application PCT/EP2011063361, filed on Aug. 3, 2011, in Europe and published as WO 2013017169 A1. The contents of the International Application are incorporated herein by reference.

BACKGROUND OF THE INVENTION

1. Field of the Invention

The present invention relates to hearing aids. The invention more particularly relates to hearing aids which can adapt the signal processing to the hearing ability of the user. The invention further relates to a method of adjusting a hearing aid.

In the context of the present disclosure, a hearing aid should be understood as a portable electronic device adapted for amplifying sound for alleviating the hearing loss of a hearing-impaired user. A hearing aid system may be monaural and comprise only one hearing aid or be binaural and comprise two hearing aids. A sound may be a sequence of tones, white noise, clicks, white noise followed by a click and other combinations of sound.

2. The Prior Art

It is known to determine a hearing threshold of a person by way of brain stem response, where the person is fitted with electrodes at specific locations of the head, making it possible to measure the brain stem response, when said person is exposed to certain sounds.

Such a system is known from WO 2008/116462 A1. Herein a system is described for assessing the hearing capability in human beings, by providing an acoustic stimulus in combination with an electrophysiological threshold measurement. A person is subjected to acoustic stimulus provided by a hearing aid while an apparatus is measuring the Auditory Brainstem Response. Such a system is particularly helpful when testing newborns or cognitive weak subjects.

WO 2011/006681 A1 describes a hearing aid adapted for detecting brain waves and adjusting the signal processor of the hearing aid according to the measured signals. The measured brain wave signal can then be used to estimate, which part of the acoustic signal, the user is focusing on. The hearing aid may hereafter adjust itself to enhance the part of the acoustic signal which the user is focusing on.

WO 2011/000383 A1 describes an ear plug with surface electrodes for measuring brain waves within the auditory canal of a human being. The ear plug is individually matched to the ear of the user whereby the electrode at the surface of the ear plug has a good connection with the skin, and each of the electrodes is always positioned at the same place within the ear canal of the user.

Despite huge progress within the hearing aid technology in recent years, it is an inherent problem, that the assessment of the hearing loss or hearing ability is based on tests where the user indicates, when he or she is able to hear a sound. This has the disadvantage, that it is not an objective measurement of the hearing ability of that person. E.g. the hearing threshold indication may be biased due to the person being tested delaying the response to verify, that there actually was a sound before responding to it, whereby the response might be attributed to a following test sound with a higher amplitude.

Persons suffering from hearing related diseases like tinnitus or Ménière's disease may have fluctuating hearing threshold for specific frequencies or may hear sounds that are not even present. In general, there are many uncertainties related to testing a person's hearing threshold, even for normal cognitive people. These uncertainties increase if the person under test is cognitive weak, e.g. small children or old people. Furthermore the ability to hear may well evolve over time, therefore the ability to hear should be tested frequently. This is however not an option for most people, as hearing tests require special equipment and sound proofed environment.

SUMMARY OF THE INVENTION

The invention, in a first aspect, provides a hearing aid adapted to determine a hearing threshold via an EEG response from a user, said hearing aid comprising an EEG sensor part having electrodes for picking up an EEG response from the user, an EEG signal analyzer adapted for monitoring and analyzing the EEG signal from the user, an EEG stimuli controlling means adapted for performing at least one of the following: providing an EEG stimulating sound to said person, soliciting said person to perform a stimulus-creating act in response to a sound provided, or identifying a potentially stimulus-creating ambient sound, a hearing threshold estimation unit, for estimating the hearing threshold of a person, based on an analysis of the EEG signal picked up in relation to the provided or identified sound.

The hearing aid is able to measure the hearing threshold of the user by monitoring an EEG response and combining the measured EEG response with the auditory environment. The EEG may further more be stimulated by playing sounds for the hearing aid user, that will trigger an EEG response.

This hearing aid comprises an EEG sensor, EEG analyzer, and EEG stimuli controlling means adapted for performing at least one of the following:

providing a stimulating sound to said person,
 soliciting said person to perform a stimulus creating act in response to a sound provided,
 identifying a potentially stimulus-creating event, the hearing aid further comprising
 sound level measuring means,
 a hearing threshold estimation unit, for estimating the hearing threshold of a person The term induced response refers to an EEG response induced by a stimulus which is distinct from the otherwise spontaneous EEG response. Examples of induced responses are listed in Table 1. One possible stimulus considered in the system described here is an auditory stimulus in a broad sense, and the measured response could e.g. be an auditory evoked response.

Auditory evoked responses can be used to trace the response generated by a sound through the ascending auditory pathway. Thus the measured response may include induced responses generated in the cochlea, the cochlear nerve, the cochlear nucleus, the superior olivary complex, the lateral lemniscus, the inferior colliculus in the midbrain, the medial geniculate body, or from the cortex. Thus an induced auditory response may reflect:

1) A direct and autonomous response to the acoustical signal in the processing of the stimulus in the auditory pathway;

2) A response caused by processing in the cortexes of the brain.

Whereas the first, referred to as an auditory evoked response, is an innate response from the auditory pathway processing, the latter may require cooperation or certain acquired skills by the user.

To exploit induced responses of the first kind the acoustical signal typically has certain simple acoustical characteristic such as e.g. an amplitude modulation or a pitch sweep.

To exploit induced responses of the second kind the signal typically has more complex information such as e.g. a series of syllables, words or even sentences containing instructions or sentences with syntactical errors.

The EEG sensor part is to be understood as the combined EEG electrodes whether these are placed together in a unit or connected only by wires. The EEG sensor part may or may not include signal acquisition means for collecting and preprocessing the EEG response from the electrodes.

The potentially stimulus-creating ambient sound could e.g. be a sudden sound after a period of relative silence. It could also be other sudden changes in the background sounds. The qualifying term potentially is included as there is no certainty that a sound identified also induces an EEG response.

In an embodiment of the hearing aid, at least one electrode is adapted to be removable and arranged in an ear canal of said person. In a further embodiment two or more electrodes are arranged in the ear canal. Two hearing aids each with at least one electrode are also possible.

In another embodiment of the hearing aid, the EEG stimuli controlling means provides auditory stimuli to said person through a receiver or speaker in the hearing aid. This has the advantage that the person does not need to perform an active act in order to have an induced EEG response. The auditory stimuli can comprise an amplitude modulated carrier-frequency played for the user. The modulation frequency can then be retracted from the EEG response, if the amplitude is above the hearing threshold. i.e. the hearing threshold can be found by varying the amplitude of the modulated signal, whereby the EEG response will reveal the carrier frequency once the amplitude is above the hearing threshold. This method is also known as the Auditory Steady-State Response (ASSR).

In another embodiment of the hearing aid, the EEG stimuli controlling means are adapted for identifying sounds from the surroundings capable of causing an induced response. This has the further advantage that the person will not even notice that the hearing threshold is being determined, and the determination may progress over long periods of time, as the user will not notice the ongoing determination.

In another embodiment of the hearing aid, the EEG stimuli controlling means are adapted for requesting said person to open and close the eyes. This will provide a very clear induced response.

In another embodiment of the hearing aid, the stimulus is repeated for a determination of the hearing threshold. This will offer more reliability in the result.

In another embodiment of the hearing aid at least one electrode adapted to be arranged in the ear canal is arranged on an ear-piece, said ear-piece being provided with a customized shape fitting the ear canal of the user. Such an ear-piece customized to the dimensions of the ear canal of the person to wear the hearing aid will make it easy for the person to arrange the ear-piece in exactly the same position every time it is used. This ensures that the EEG response is obtained from the same position every time the monitor is used. Thereby the EEG response obtained in one time period will be comparable with an EEG response obtained in a different time period where the ear-piece has been removed and re-arranged between the two time periods. Providing the ear-piece with a customized shape e.g. also including resilient materials, makes the ear-piece more comfortable to wear.

In another embodiment, the hearing aid can determine other audiometric parameters of the users hearing ability such as masking, that be temporal, frequency or binaural masking. The hearing aid according to the invention may further be able to determine the recruitment curve, dead regions, tinnitus, speech intelligibility, most comfortable level, upper comfort level etc.

In an embodiment of the hearing aid, the measured hearing threshold is used for automatically setting a new gain value of the hearing aid, preferably after a number of hearing threshold tests, whereby the gain may be set according to an average of the measured threshold values.

An advantage of the hearing aid proposed herein, is that the hearing aid is able to control all delays within the system, whereby perfect timing and synchronization of the signals within the hearing aid is possible.

The invention, in a second aspect, provides A method of adjusting a hearing aid, the hearing aid having means for measuring an EEG response of the user, comprising the steps of exposing the user to a sequence of test sounds having an amplitude and frequency; picking up an EEG response of a user, correlating the amplitude and frequency of the test sound with the EEG response picked up from the user; determining the hearing threshold based on the correlated amplitude and frequency of the test sound with the EEG response picked up from the user; and adjusting the hearing aid in accordance with the threshold determined.

BRIEF DESCRIPTION OF THE DRAWINGS

Examples of embodiments will now be described with reference to the drawings.

DETAILED DESCRIPTION

Figure 1:
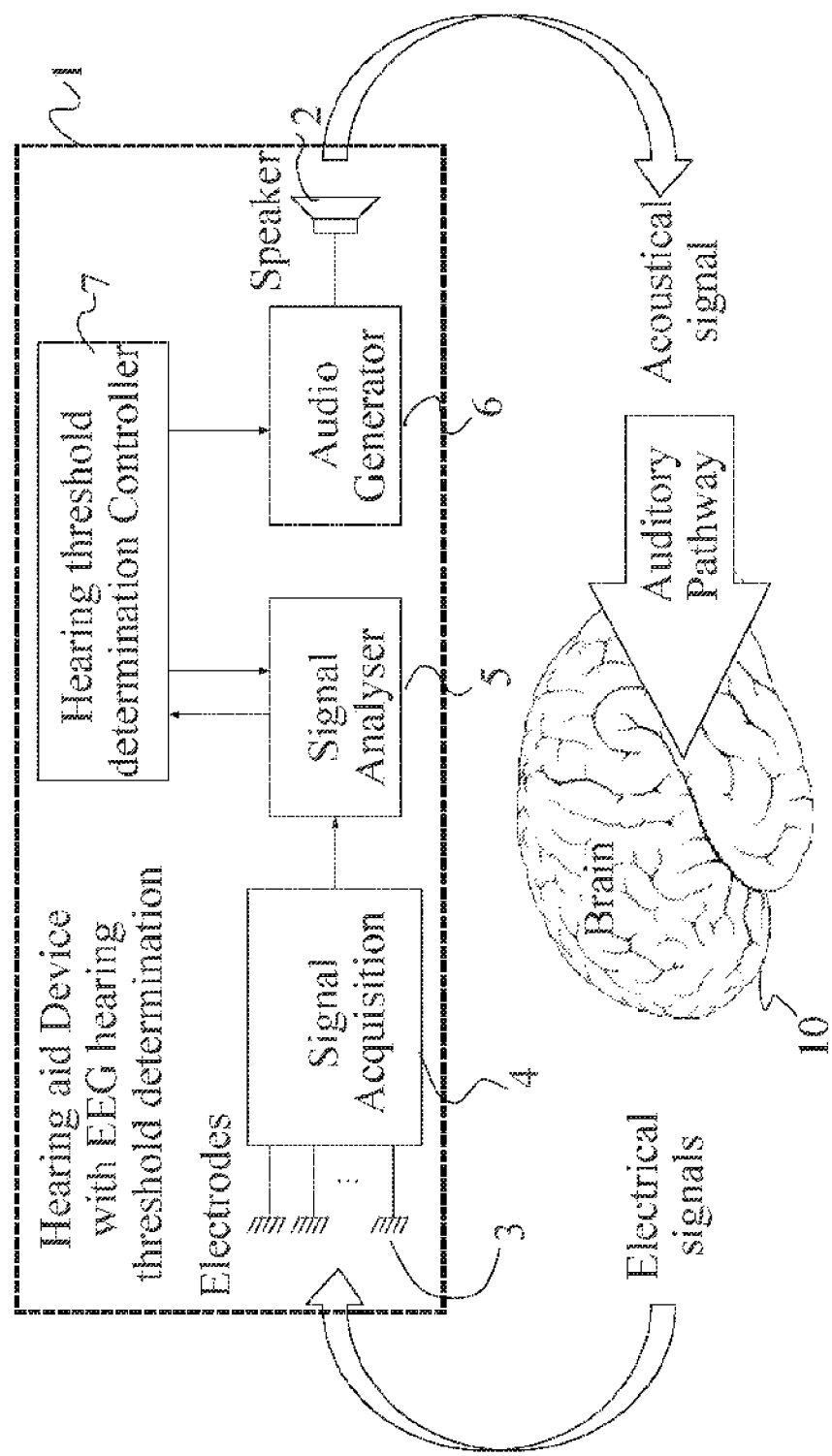
FIG. 1 illustrates a block diagram of a Hearing Aid incorporating a Hearing Threshold Determination System based on auditory evoked response caused by an audio stimulus generated by a speaker.

FIG. 1 shows a hearing aid according to the invention, where it induces a potentially EEG creating sound to the user, and receives an EEG response from the user's brain 10. The dashed box indicates the hearing aid 1 with the EEG hearing threshold determination system. The hearing aid includes a speaker 2 that receives an electrical signal from an audio generator 6 and generates an acoustical signal. The acoustical signal is intended to lead to an induced EEG response, either directly by the sound alone, thereby obtaining an auditory evoked response, or indirectly by guiding the person to perform an act in response to a sound, where this act will cause an induced response in the EEG response.

The hearing aid 1 includes at least two electrodes 3 for measuring the EEG response from the user's brain 10. The hearing threshold determination system comprises signal acquisition means 4 for acquiring the EEG response from the electrodes 3. The electrodes 3 form the EEG sensor part. The signal acquisition means 4 could also have been placed as part of the EEG sensor part. The signal is sent to an EEG signal analyzer 5 where monitoring and analysis of the EEG response is performed, by investigating the EEG response for indications of whether the user is able to hear the sound played by the speaker 2. A hearing threshold determination controller 7 compares acquired signals from the electrodes 3 with the timing of acoustical signals given by the audio generator 6 and speaker 2. Based on this the hearing threshold determination controller 7 decides if the signal acquired by the electrodes is an EEG response related to an auditory evoked response. A classifier decides if the electrodes 3 detect an induced response, and thereby receives the EEG response. The classifier is part of either the hearing threshold determination controller 7 or the signal analyzer 5. The electrodes 3 and the signal acquisition together form an EEG sensor.

The EEG stimuli controlling means in the embodiment of FIG. 1 includes the audio generator 6. The EEG response detection means are part of the hearing threshold determination controller 7 and identifies induced response in the EEG signal received from the EEG signal analyzer 5.

As a hearing aid inherently comprises a microphone (not shown at FIG. 1), this microphone may be used to determine whether the ambient sound environment is suitable for conducting a hearing threshold measurement. This will enable the hearing aid to reject the initiation of a hearing threshold measurement, if the surrounding noise level is too high.

The induced response amplitudes are in general low compared to the spontaneous response amplitudes and therefore it may be necessary to time-average the signals from several stimulations. Because the spontaneous EEG signal by definition is independent of the stimulus, time-averaging can be obtained by adding several time frames of the signal synchronized to respective stimuli. The power of the induced response part of the signal increases with 3 dB every time the number of time averages is doubled. I.e. 3 dB can be obtained at two time-averages, 6 dB can be obtained by four averages, and 9 dB can be obtained by eight averages. The noise will only increase at a factor $\sqrt{2}$ per additional average, because the signal is correlated, whereas the noise is uncorrelated.

Examples of EEG induced response schemes suitable for hearing threshold determination are listed in Table 1. Two of the examples in Table 1 are based on so called mismatch negativity (MMN) or oddball paradigm. The MMN or oddball paradigm is a technique used in general to explore event-related responses (ERP). The event-related response is elicited by an unexpected change in a sequence of stimuli. For example, a deviant (d) sound with low probability can be mixed among a series of standard (s) sounds with high probability (e.g., s s s s s s d s s s s s s d s s s . . . ). Simple sounds will be applied for this, e.g. a number of "bib" sounds interrupted by a single "bob" sound. Such sequence is called an oddball sequence.

The deviant sound can differ from the standard sounds in one or more perceptual features such as pitch, duration, or loudness. The event-related response can be elicited regardless of whether the subject is paying attention to the sequence or not. During the oddball sequence, a person can be reading or watching a silent subtitled movie, yet still show a clear MMN. The evoked response following an oddball is known as P300 and is typically detected 200-400 ms after the oddball. This function has the advantage compared to the ASSR assessment, that the EEG response is easier detectable, because the ASSR function near the hearing threshold level will have a very small amplitude and therefore be harder to recognize, whereas the ERP is likely to create a more distinct signal with an amplitude that is not proportional to the sound amplitude, whereby the MMN response is easier recognizable, over the spontaneous EEG response.

Figure 2:
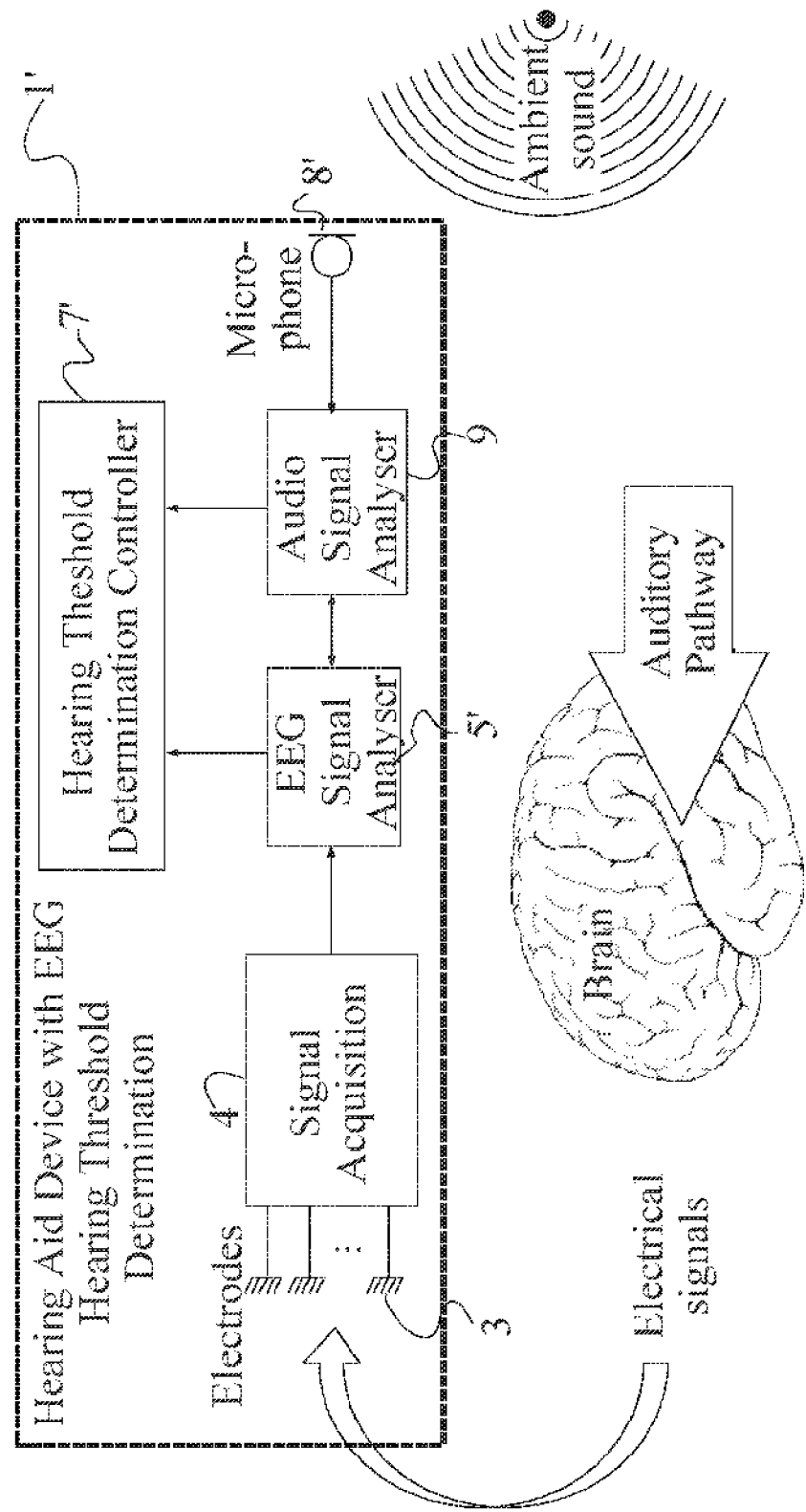
FIG. 2 illustrates the block diagram of FIG. 1, with the change that the audio stimulus is from the user's sound environment.

FIG. 2 shows a hearing aid for hearing threshold determination, based on potentially EEG stimulating sounds from the environment. The dashed box indicates the hearing aid 1'. The hearing aid 1' includes a microphone 8' that measures the ambient sound environment, and an audio signal analyzer block 9 for identifying sounds in the surrounding environment which potentially could cause an induced EEG response. The hearing aid 1' further includes at least two electrodes 3 for picking up the EEG response from the user's brain, signal acquisition means 4 for acquiring an EEG response from the electrodes 3, a signal analyzer 5' for analyzing the acquired response, a hearing threshold determination controller 7' comparing the acquired response from the electrodes 3 with an acoustic signal recorded by the microphone 8', in order to decide whether sounds from the surroundings may cause induced responses, and finally decide if the response acquired by the electrodes 3 are evoked EEG responses.

The EEG stimuli controlling means corresponds in the embodiment of FIG. 2 to the audio signal analyzer 9.

The EEG signal analyzer 5' and the audio signal analyzer 9 may for instance comprise algorithms for envelope-spectrum estimation, and the hearing threshold determination may comprise algorithms to exploit the dependencies between the EEG-envelope spectrum and the audio-envelope spectrum. An advantage of this system is that the hearing test may be running at all times and without disturbing the users with audio signals.

Examples of induced response schemes suitable for hearing threshold determination are given in table 1, where each scheme is described in detail.

TABLE 1

Examples of induced response schemes

| Scheme | Description |
| --- | --- |
| Brainstem Auditory-Evoked Responses (BAEP) or Auditory Steady State Response (ASSR) | In BAEP the stimuli are typically clicks or tones. Click stimuli can for instance be 8-10 clicks/sec. Tones can be on/off modulated; or for instance a 500, 1000, 2000, or 4000 Hz carrier amplitude modulated (AM) with modulation rate of e.g. 40-100 Hz. The modulator signal frequency and harmonics thereof can be detected in the EEG response. |
| Harmonic oddball | An oddball sequence comprising harmonic (h) and disharmonic (d) sounds (e.g.: h h h h h h h h d h h h h h h d h h h h d h h h . . .). An ERP can be detected in the EEG. |
| Linguistic oddball | Linguistic anomalies or violations of syntactic or semantic rules in the acoustic stimuli cause ERPs. An ERP can be detected in the EEG. |
| Open/closed eyes | Alpha waves are oscillations in the frequency range of 8-12 Hz arising from synchronous and coherent electrical activity of cells in the human brain. Alpha waves in EEG predominantly originate from the brain during wakeful relaxation with closed eyes. Thus by instructing the user to "open" or "close" the eyes a simple induced-by-instruction paradigm is established. This is also known as an Alpha Attenuation Test (AAT). |

Figure 3:
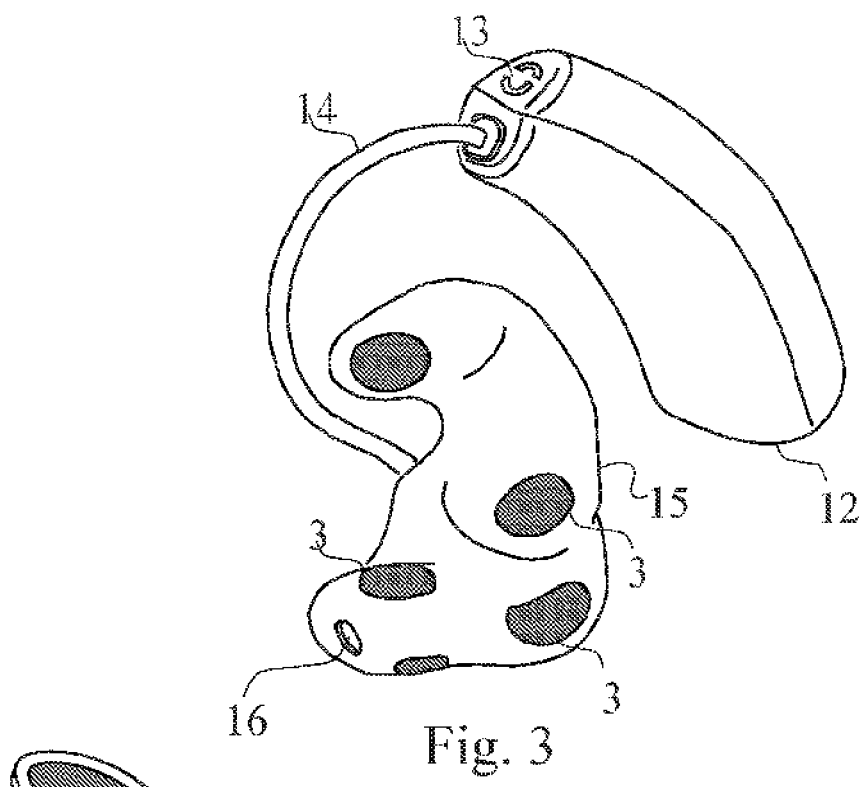
FIG. 3 illustrates an example of a hearing aid with hearing threshold determination, with electrodes arranged on an ear plug.

FIG. 3 shows a sketch of an embodiment of an EEG enabled hearing aid. The hearing aid is a behind-the-ear (BTE) style hearing aid 12. Typically it comprises a behind-the-ear part 12 with battery, electronic circuit and a microphone. The hearing aid further comprises an ear-piece 15 and a connecting wire 14 between the behind-the-ear part 12 and the ear-piece 15. The electrodes 3 are placed on the surface of a custom made ear-piece 15. The sound outlet 16 shown on the ear-piece provides the acoustic stimuli, generated by the hearing aid, to the user. The speaker (or receiver) of the hearing aid may be placed in the behind-the-ear part 12 and then connected to the ear-device 15 through a sound tube, or the speaker may be placed in the ear-piece 15. The sound-outlet 16 may also provide an acoustical feed-through (vent) in order that the ear-piece 15 does not occlude the ear. The connecting wire 14 is a sound-tube or a sound-guide in the case where the speaker is placed in the behind-the-ear device 12. If the speaker is placed in the ear-piece 15 the connecting wire 14 is an electrical wire. The signal acquisition, i.e. pre-amplifier and analogue to digital converters (ADC's), may be placed in the ear-piece 15 or in the behind-the-ear part 12. The behind-the-ear part 12 may comprise a microphone 13, or the microphone could be placed in the ear piece 15.

Figure 4:
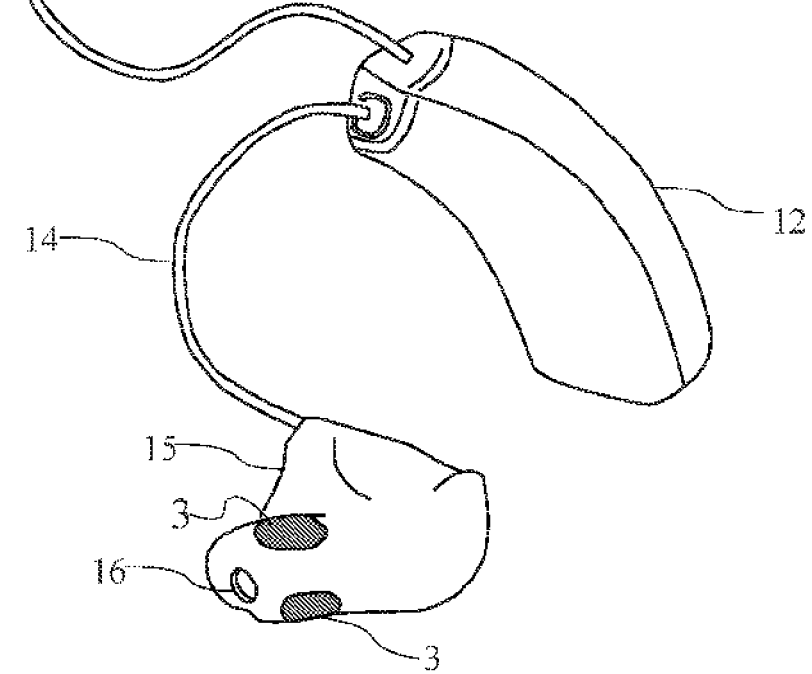
FIG. 4 illustrates a further example of a hearing aid with hearing threshold determination, with a further pad electrode.

FIG. 4 shows a further embodiment of a hearing aid. The hearing aid has electrodes 3 on the ear-piece 15 as the embodiment of FIG. 3, but is also provided with a pad electrode 20 connected to the behind-the-ear part 12 through a wire 21. Such a pad electrode can be arranged on the head of the user, at a point outside the ear canal away from the BTE housing. This can be relevant for determining certain auditory parameters.

In an embodiment of the invention the electrodes may also be placed at e.g. the surface of a housing for the electronics, e.g. a behind the ear part 12.

Figure 5:
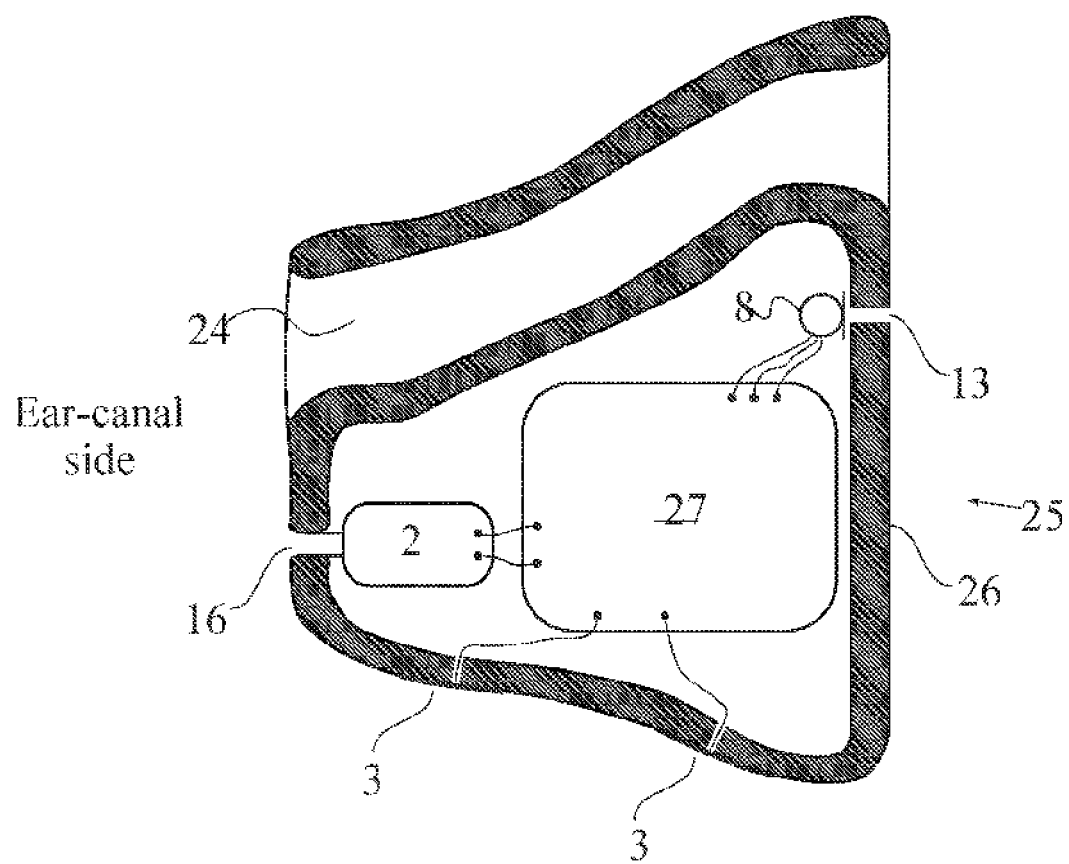
FIG. 5 illustrates a completely-in-the-ear-canal hearing aid.

FIG. 5 shows a completely in-the-ear embodiment of the hearing aid in a cross sectional view. The contours of the outer surface 26 of the ear piece are manufactured to follow the contours of at least part of the ear canal and the concha of the user. The electrodes 3 are embedded in the part of the ear piece 25 outer surface 26 that is matched to follow the ear of the user. The hearing aid also comprises an electronic module 27, e.g. comprising various blocks of FIG. 1 or 2, a microphone 8 and a speaker or receiver 2. The sketch shows electric wires connecting the electrodes 3, the microphone 8 and the speaker 2 with the electronic module 27. The electronic module comprises means for data acquisition, signal analysis and hearing threshold determination. The ear piece has a ventilation channel 24 for the purpose of avoiding acoustical occlusion of the user's ear-canal i.e. blocking of the ear canal. Further the ear piece has an opening 13 for the microphone 8 and an opening 16 for the receiver 2.

Figure 6:
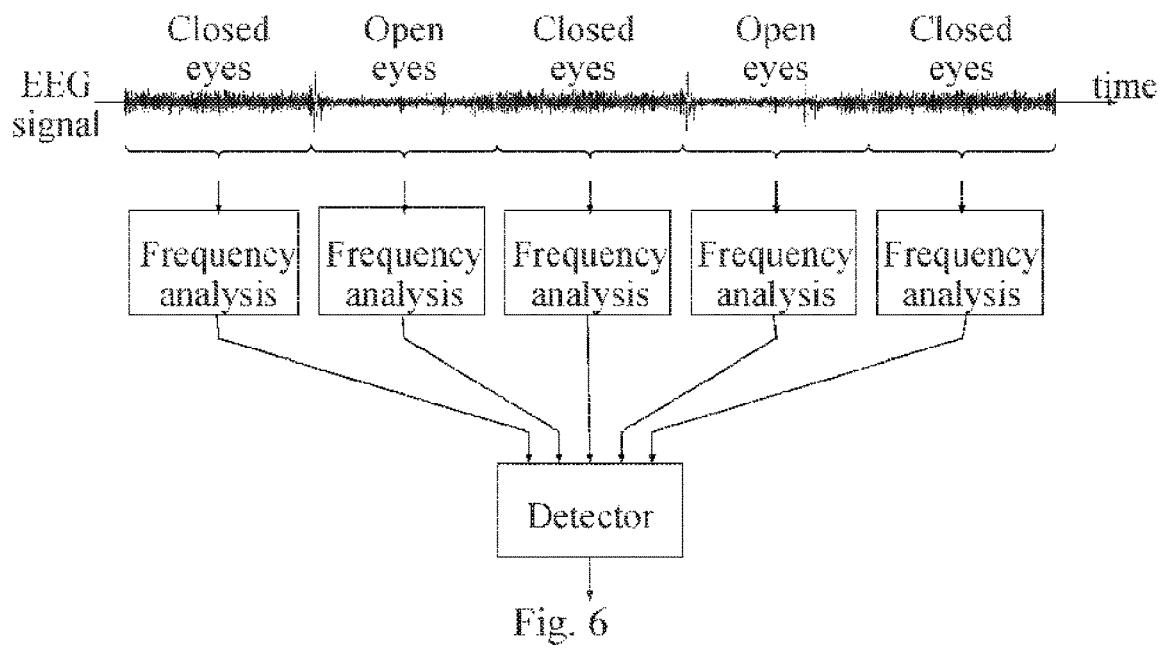
FIG. 6 illustrates initial signal analysis of different time periods.

FIG. 6 shows a layout for the alpha-band detection scheme. This could be applied when the hearing threshold determination is based on an open/closed eye scheme. The figure shows a time axis whereon an EEG response as a function of the user opening and closing the eyes is plotted. The detection of an EEG response indicating that the user opens or closes the eyes can then be compared with the sound amplitude and frequency, exposed to the user, whereby the hearing threshold can be determined.

Alpha waves in EEG predominantly originate from the brain during wakeful relaxation with closed eyes. By instructing the user to "open" or "close" the eyes when a sound is heard a simple induced-by-hearing paradigm is established. Thus by comparing the frequency distribution between open eyes epochs and closed eyes epochs with the sound amplitude at a certain frequency, it is possible to make a reliable and robust hearing threshold test. The instructions may be that the eyes should be closed, and when the user hears a sound, the eyes should be opened. The sound would have a certain frequency and start at low amplitude, the amplitude is then increased until a response indicating open eyes is received or vice versa. The test is repeated with sounds of different frequency.

Figure 7:
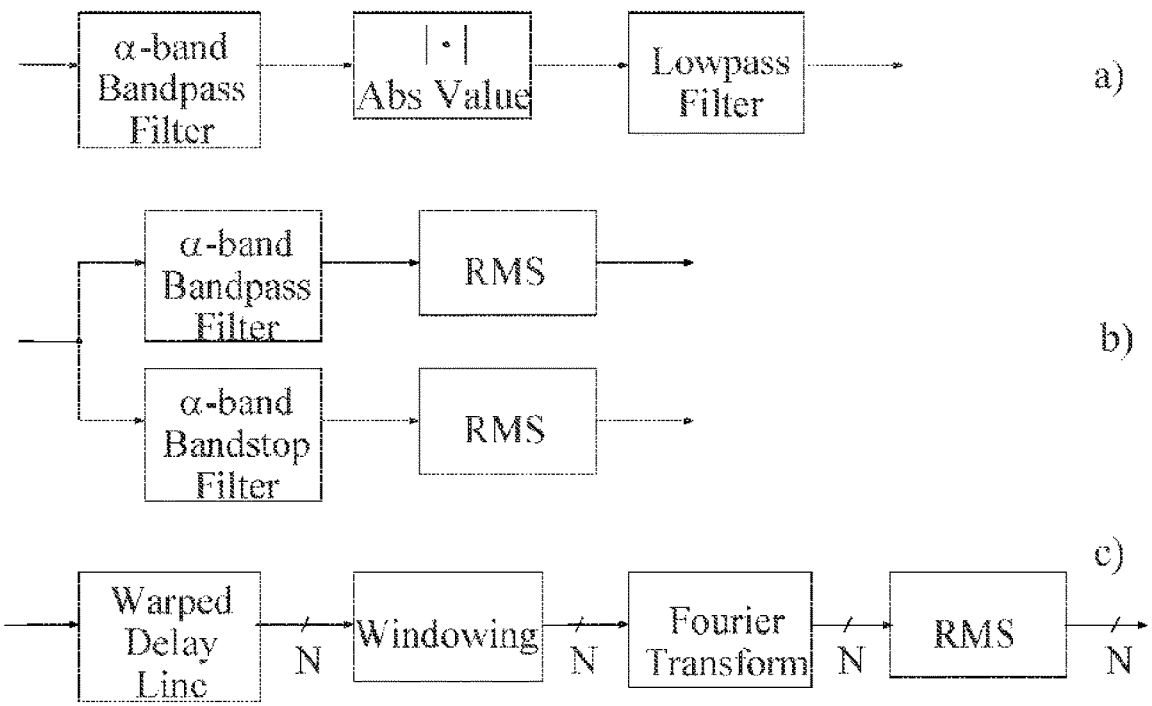
FIG. 7 illustrates three different examples of block diagrams for the frequency analysis blocks in FIG. 6.

FIG. 7, part a, shows three examples of block diagrams for the frequency analysis blocks in FIG. 6. The alpha-band bandpass filter in FIG. 7, part a, has a pass band in the 8-12 Hz frequency range. The second block in FIG. 7, part a, is a first norm or the absolute value of the signal. The lowpass filter in FIG. 7, part a, is averaging the signal. This lowpass filter could be a first or second order recursive filter.

In FIG. 7, part b, there are two branches where the top branch finds the energy in the alpha band and the branch below finds the energy outside the alpha band. The first block in the top branch is a bandpass filter allowing only frequencies in the alpha band to pass. The first block in the branch below is a bandstop filter blocking frequencies in the alpha band but allowing other frequencies to pass. The second block in both branches in FIG. 7, part b, calculates the Root Mean Square of the signal.

FIG. 7, part c, shows an embodiment of a Short Time Fourier Analysis. The first block, Warped Delay Line, is a known method for changing the frequency scale in order to obtain a better resolution at low frequencies. Hereafter the signal is subjected to a windowing function, allowing the signal to go through a Fourier transformation and finally the signal can be averaged using an RMS function.

Figure 8:
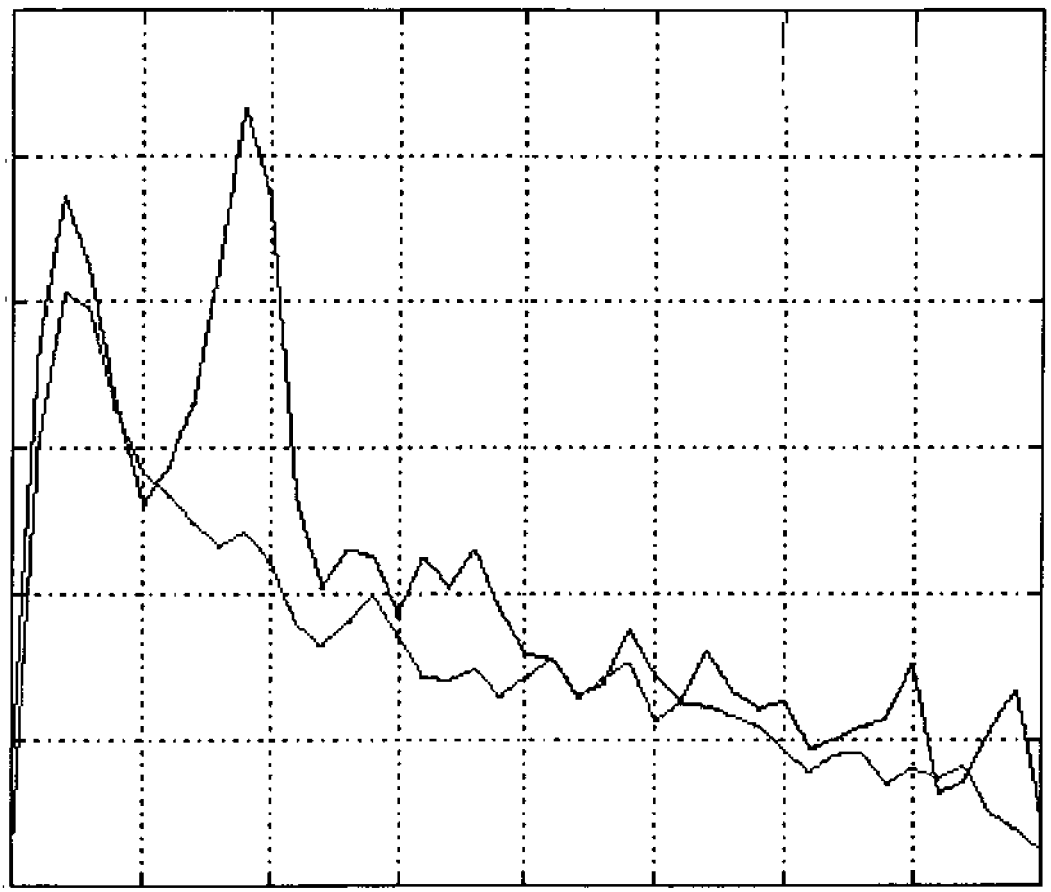
FIG. 8 illustrates example of power spectrum for EEG sampled with eyes closed and open, respectively.

FIG. 8 shows power spectra from an in-the-ear type electrode. The signal is sampled at 512 Hz. In the first 30 seconds the person has the eyes closed and in the next 30 seconds the person has the eyes open. The two curves show the power spectra for the first and the second 30 seconds time windows. The power spectra are computed using the Welch method with window length 512 samples, Hamming-window, and 50% overlap between windows. There is a clear difference between the "open eyes" and "closed eyes" power spectrum in the alpha band (frequency range of 8-12 Hz).

Figure 9:
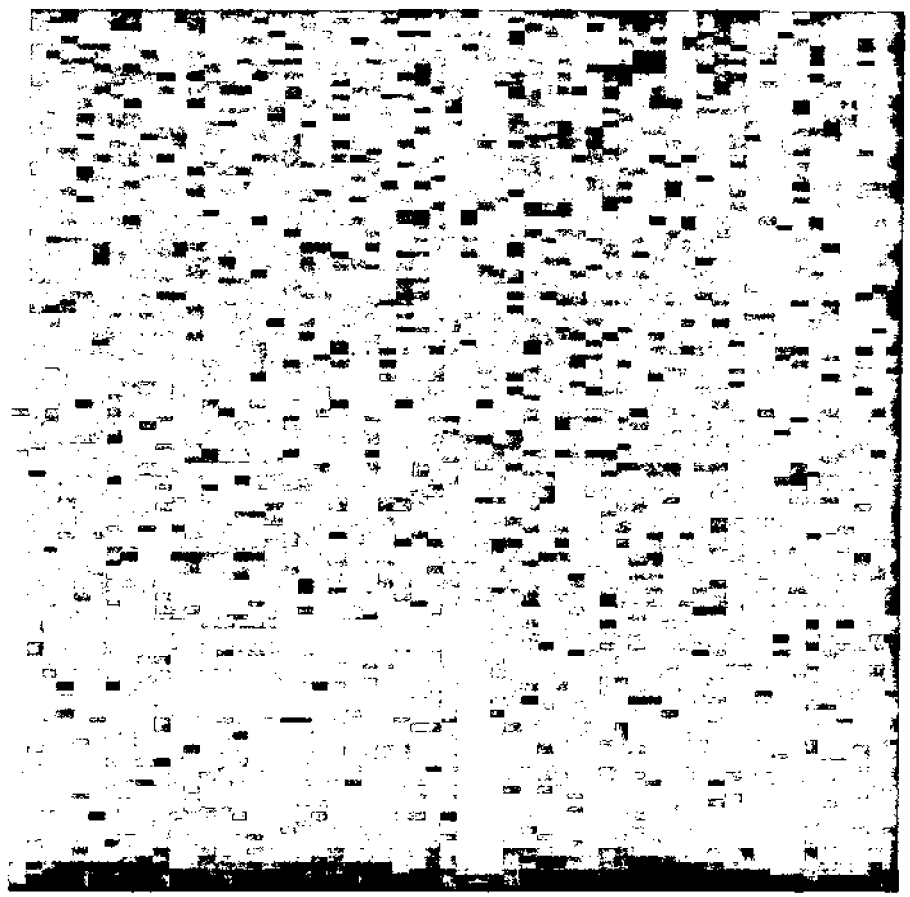
FIG. 9 illustrates a time frequency plot of the signal analyzed in FIG. 8.

FIG. 9 shows the time frequency plot for the same signal as in FIG. 8 but re-sampled to 64 Hz sample rate. The spectrogram is computed using the Short Time Fourier Transform (STFT), 512 samples in each window, and 64 new samples in each STFT. There is a clear increase of signal level in the alpha band for the open eye sequence compared to the closed eye sequence, i.e. the time period from 30 seconds and forth.

Figure 10:
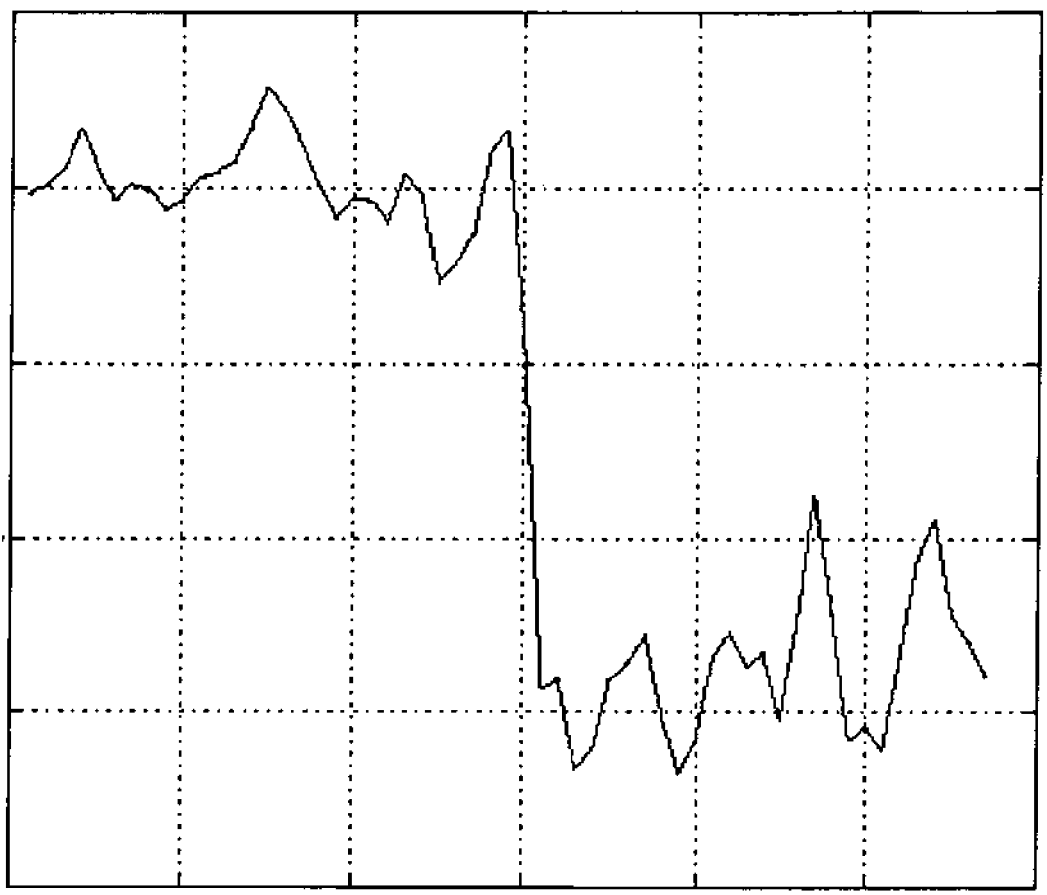
FIG. 10 illustrates the mean values of the frequency components in the alpha band, i.e. the mean value of a subsample of the second axis in FIG. 9.

FIG. 10 shows the same signal as in FIGS. 8 and 9. The curve shows the power of the alpha band (8-12 Hz) computed from the corresponding taps of the STFT from the spectrogram shown in FIG. 9. The curve shows a significant drop in alpha band power at 30 seconds, where the eyes are opened.

Figure 11:
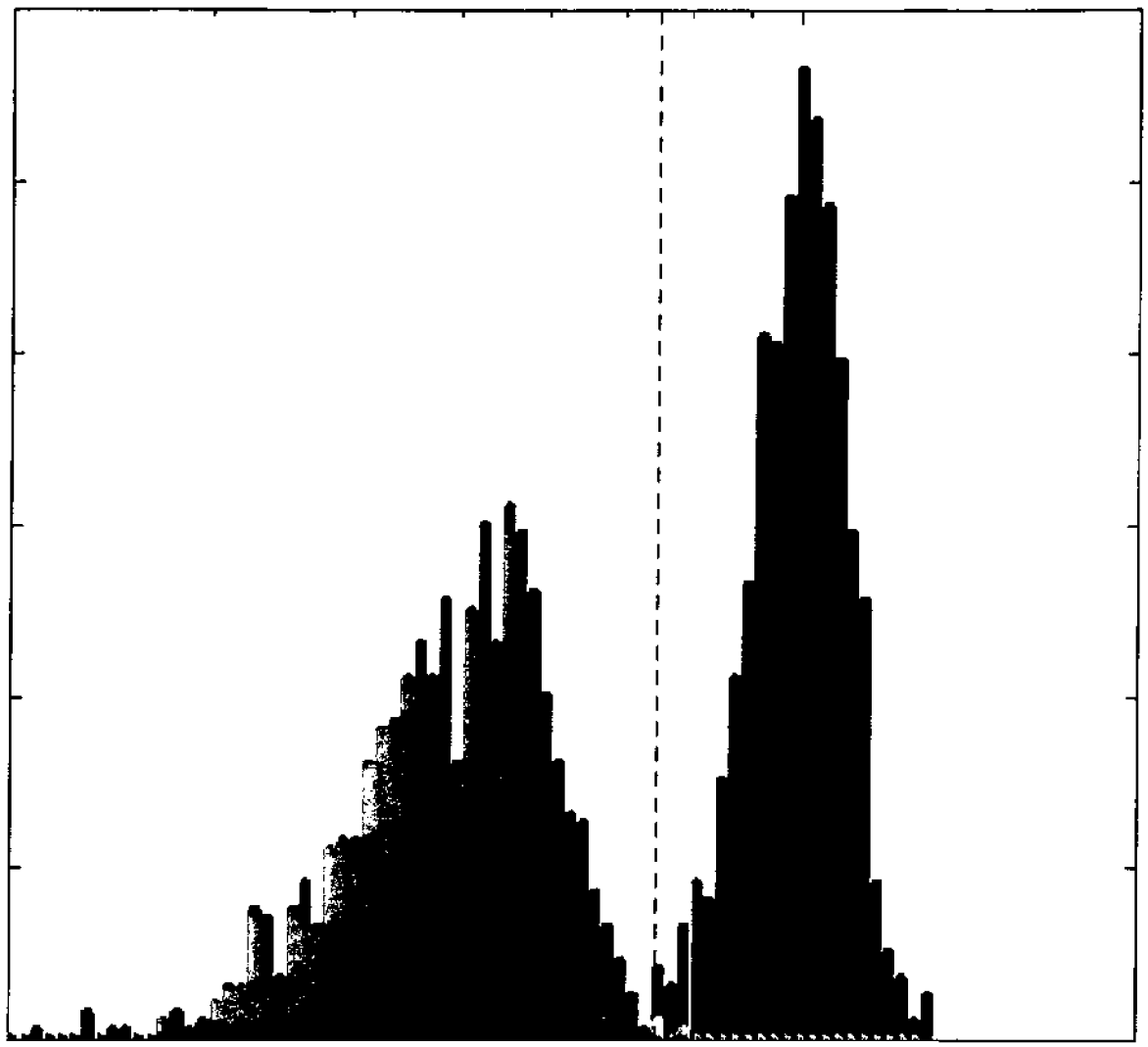
FIG. 11 illustrates a histogram of the alpha band power of the signal analyzed in FIG. 8, i.e. a histogram of the signal in FIG. 10.

FIG. 11 shows a simple one dimensional binary classifier for the alpha band detection scheme. The grey bars represent the histogram for the power in the alpha-band for the "Open eye" data and the black bars represents the histogram for the "Closed eye" data. The dashed line shown is the discrimination level which results in the classification performance printed in the small table in the left part of FIG. 11. It is seen from this table that the specification and the accuracy are relatively good, implying that two measurements usually will be sufficient.

Figure 12:
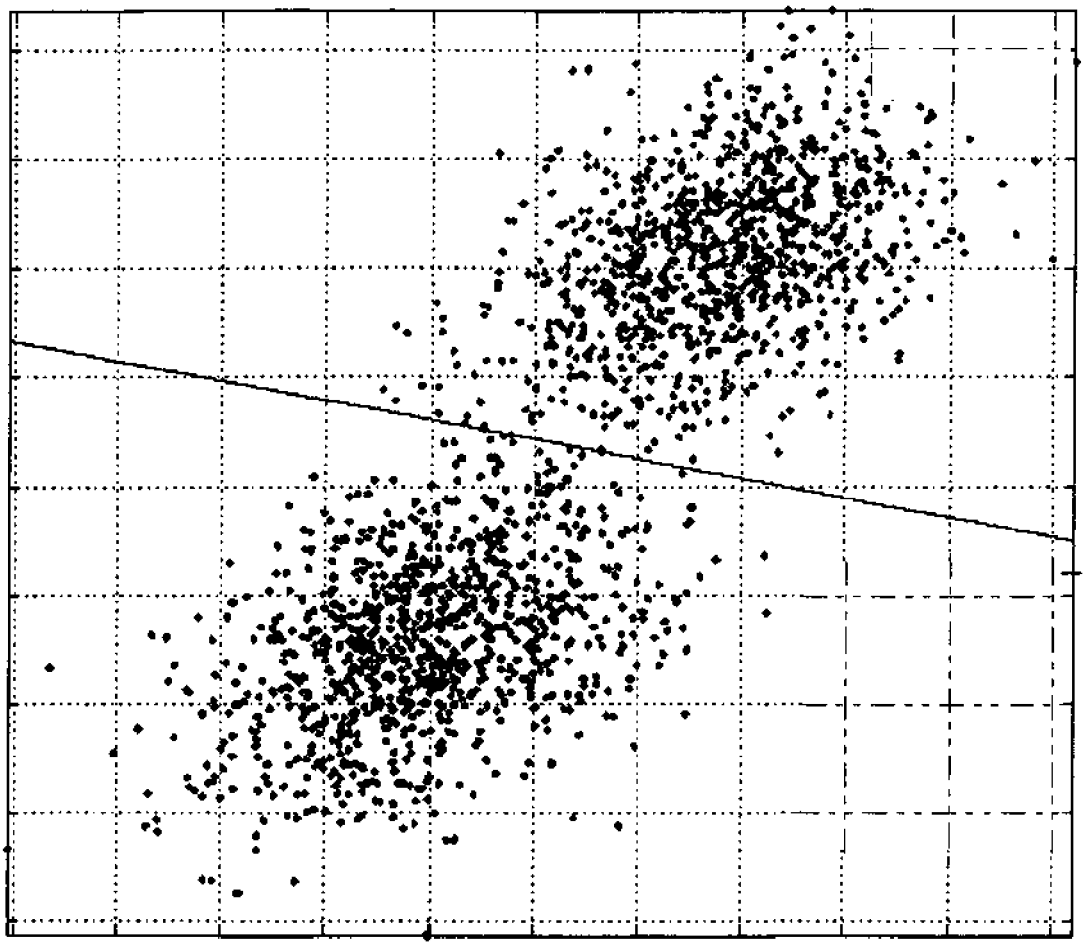
FIG. 12 illustrates a simulated example of a two dimensional classifier.

FIG. 12 shows a depiction of a two dimensional binary classifier for the alpha band detection scheme. The plot is a scatter plot where the dots represent data points in the feature space (dimension 1 versus dimension 2), and the solid line is the linear discrimination line. The black and gray dots represent data points from class 1 and 2 respectively. FIG. 12 shows a simulation example where the detector has two inputs; e.g. dimension 1 is the power from the alpha band and dimension 2 is the power from all other frequency bands. This could be obtained by the block diagram in FIG. 7, part b where the top signal branch in FIG. 7, part b provides dimension 1, and the below signal branch in FIG. 7, part b, provides dimension 2. In this example "Class 2" would be the "Closed eye" data and "Class 1" would be the "Open eye" data. This can be further generalized to non-linear classifiers, and to higher order linear or nonlinear classifiers.

The hearing threshold determination may also be performed by a combination of different methods. E.g. the method based on generated audio-stimuli and the method based on ambient sounds may be combined. One example of such a combined system could be that the hearing test based on generated audio signals is performed when the hearing aid is switched on or whenever the user requests a hearing test. The hearing test based on the ambient sound environment will run continuously whenever the hearing aid is in use. The advantage of combining different measurement methods is that this may improve the hearing threshold determination in terms of reliability, robustness, the ability to distinguish between different fault causes etc. Furthermore the test may be used in addition to an initial ordinary fitting procedure, or it may be used as a standalone fitting procedure.

In the event that the hearing threshold determination system cannot establish that the electrodes receive an EEG response, a notification could be given to the person wearing the hearing aid. This will enable the person to adjust the position of the EEG electrodes in order to make sure that there is a good electrical connection between the electrodes and the skin. The notification could be in the form of a sound message, e.g. a voice message informing the person what to do.

The system described herein may further include a remote control or other external device. Part of the analysis, hearing threshold estimation or gain adjustment setting may take place in such an external device, where data is transferred between the external device and the hearing aid via a wired or wireless connection.

We claim:

1. A hearing aid adapted to determine a hearing threshold via an EEG response from a user, said hearing aid comprising a microphone for detecting ambient sound and a processor for processing an output signal from the microphone to compensate for a hearing impairment of the user, said hearing aid further comprising:
   an EEG sensor part having electrodes for picking up an EEG signal from the user,
   an EEG signal analyzer adapted for monitoring and analyzing the EEG signal from the user,
   an EEG stimuli controller adapted to:
      solicit said user to perform a stimulus-creating physical movement in response to a test sound provided, and
      provide at least one said test sound independently of said microphone, and
   a hearing threshold estimation unit for estimating the hearing threshold of said user, based on an analysis of the EEG signal picked up in response to the stimulus-creating physical movement.

2. The hearing aid according to claim 1, wherein said EEG stimuli controller identifies sounds from the surroundings potentially causing an identifiable induced EEG response.

3. The hearing aid according to claim 1, wherein said EEG stimuli controller instructs the user to open or close their eyes in response to said at least one test sound, wherein the user opening or closing their eyes is the stimulus-creating physical movement.

4. The hearing aid according to claim 1, further comprising a pad electrode external to an ear piece of the hearing aid, said pad electrode adapted to be arranged on the head of the hearing aid user.

5. The hearing aid according to claim 1, wherein the hearing threshold estimation unit sets the gain of the hearing aid.

6. The hearing aid according to claim 1, wherein the hearing threshold estimation unit sets at least one parameter of the hearing aid according to an ambient sound environment correlated with the EEG signal.

7. The hearing aid according to claim 1, wherein said EEG stimuli controller provides a plurality of said test sounds differing in at least one of frequency or amplitude.

8. The hearing aid according to claim 1, wherein said EEG stimuli controller identifies a potentially stimulus-creating ambient sound and wherein said identified ambient sound is a sound which may or may not cause an induced EEG response depending on the user's hearing threshold.

9. The hearing aid according to claim 1, wherein said hearing threshold is estimated based on an analysis of induced EEG responses corresponding to a plurality of said test sounds.

10. A hearing aid adapted to determine a hearing threshold via an EEG response from a user, said hearing aid comprising a microphone for detecting ambient sound and a processor for processing an output signal from the microphone to compensate for a hearing impairment of the user, said hearing aid further comprising:

an EEG sensor part having electrodes for picking up an EEG signal from the user, an EEG signal analyzer adapted for monitoring and analyzing the EEG signal from the user, an EEG stimuli controller adapted to provide an EEG stimulating sound to said user independently of said microphone, said EEG stimulating sound comprising a sequence of stimuli including a mix of harmonic and disharmonic sounds, and a hearing threshold estimation unit for estimating the hearing threshold of said user, based on an analysis of the EEG signal picked up in relation to the EEG stimulating sound.

11. The hearing aid according to claim 10, wherein the EEG stimuli controller is adapted to repeatedly provide the EEG stimulating sound.

12. The hearing aid according to claim 10, further comprising means for setting one or more parameters of the hearing aid based on a correlation of the EEG signal, and the amplitude and frequency of the EEG stimulating sound.

13. The hearing aid according to claim 10, wherein said EEG stimuli controller identifies a potentially stimulus-creating ambient sound and said hearing threshold estimation unit estimates said hearing threshold based on analysis of the EEG signal performed subsequent to the EEG stimuli controller identifying said potentially stimulus-creating ambient sound.

14. The hearing aid according to claim 10, further comprising a pad electrode external to an ear piece of the hearing aid, said pad electrode adapted to be arranged on the head of the hearing aid user.

15. The hearing aid according to claim 10, wherein the hearing threshold estimation unit sets at least one parameter of the hearing aid according to an ambient sound environment correlated with the EEG signal.

* * * * *